March 12, 1940. J. DOLZA 2,193,672
GEAR SHIFT MECHANISM
Filed Nov. 9, 1938 2 Sheets-Sheet 1

Inventor
John Dolza
By Blackmore, Spencer & Flint
Attorneys

Patented Mar. 12, 1940

2,193,672

UNITED STATES PATENT OFFICE 2,193,672

GEAR SHIFT MECHANISM

John Dolza, Flint, Mich., assignor to General Motors Corporation, Detroit, Mich., a corporation of Delaware Application November 9, 1938, Serial No. 239,668

4 Claims. (Cl. 74—473)

This invention relates to control mechanism for variable ratio power transmitting gearing between an input and an output member in which step by step ratio changes are made by positively coupling at will any selected one of several trains adapted to transmit power between the input and the output members. It appertains particularly to means for changing ratios in variable ratio gearing in which one or more of the several trains are positively coupled with the aid of friction synchronizers while the others are coupled without such aid.

Objects of the invention are to operate the synchronizing elements of the synchronized positive coupling element at a higher mechanical advantage than that utilized thereafter to move the positive coupling elements into mesh; to impart to the unsynchronized coupling elements a speedy and uniform movement of greater amplitude than that imparted to the synchronized coupling element; to impart the necessary ratio changing movements with ease, silence and smoothness, and otherwise facilitate the transfer of power flow from one train to another of different ratio.

The invention comprises, singly and in combinations: means including a lever arm for shifting the synchronized couplings, said arm including a cam-like end contoured to impart a relatively slow and forceful movement to a shifter element for effecting engagement, during a first moiety of its movement, between friction synchronizing elements, and thereafter a more rapid and less forceful movement for effecting engagement of the synchronized positive coupling elements; a lever arm for shifting the unsynchronized coupling elements, this arm including a cam-like end contoured to impart uniform movement to the shifter element that is arranged to move the unsynchronized coupling elements to effect their engagement. It further comprises a rock shaft extending transversely of the transmission gearing and gear casing, said rock shaft having non-rotatively affixed thereto a lever arm provided with a cam-like and contoured to shift the synchronized elements with variable force and speed, and a longer lever arm having a cam-like and so contoured as to impart a uniform movement to the unsynchronized positive coupling elements, and means for effecting selective engagement of one or the other lever arms with the respective shifter elements for bringing about changes of ratio.

In the accompanying drawings, in which like reference characters indicate like parts throughout the several views, Fig. 1 is a plan view of a control means according to this invention associated with and arranged to operate on a transmission mechanism, shown partly in section, of a type essential to the operation of this invention.

The invention is illustrated as applied to a known combination of shiftable gears and clutches constituting a variable ratio automobile transmission mechanism comprising three different ratio trains for forward driving and one for reverse driving interposed between the input and output shafts.

Figure 1:
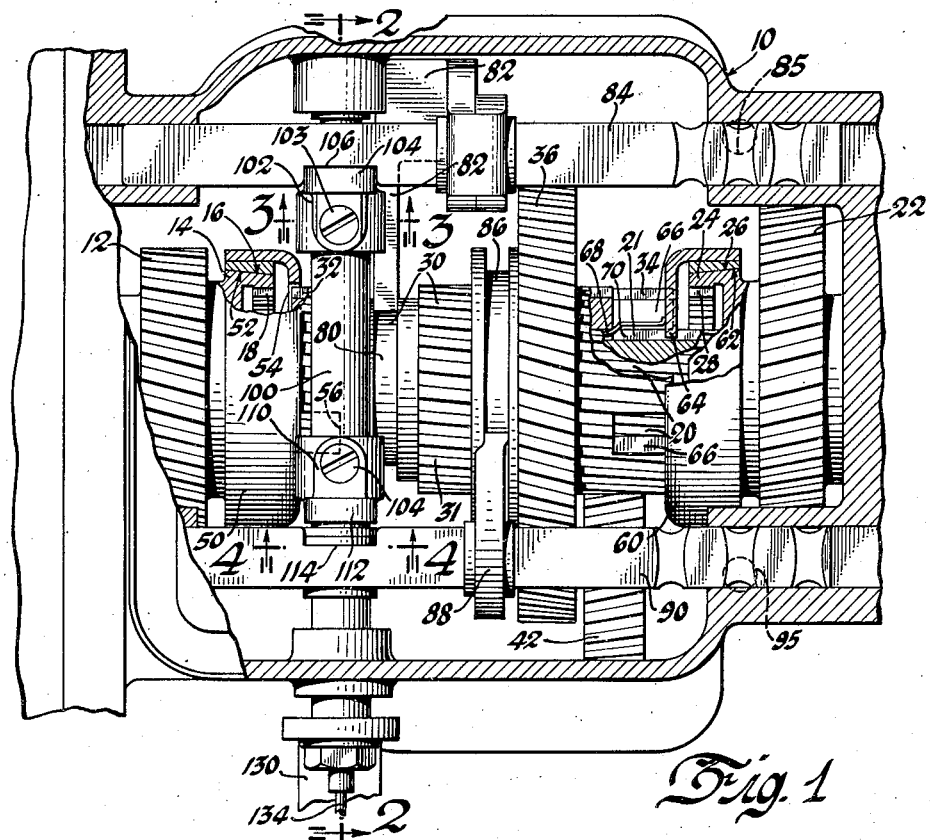
Figure 2:
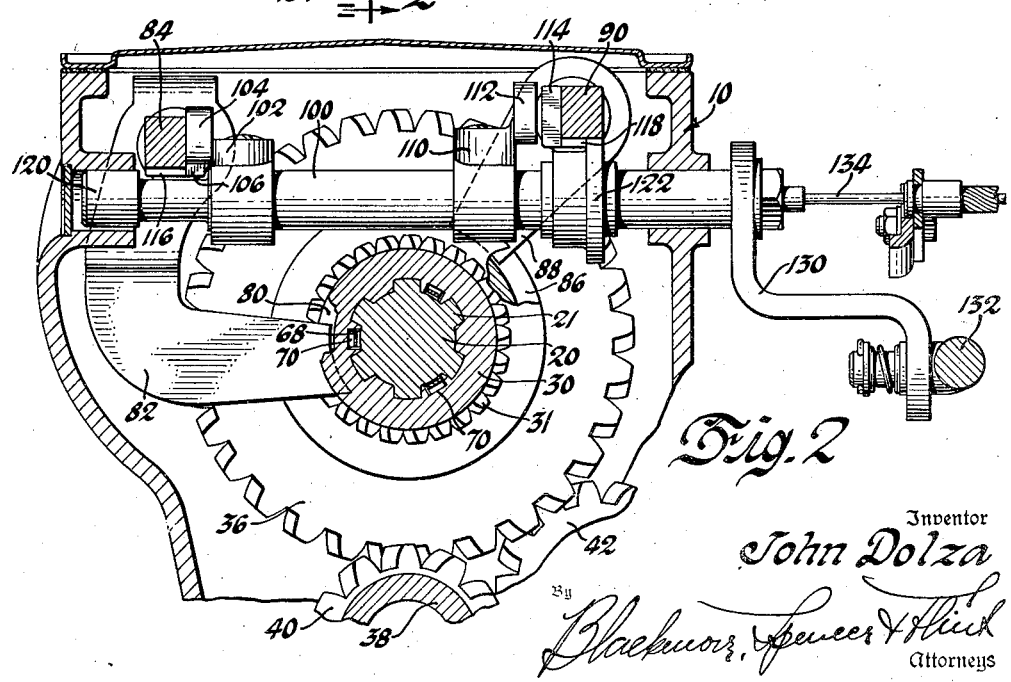
Fig. 2 is a cross section taken on line 2—2 of Fig. 1.

In Figs. 1 and 2 numeral 10 indicates a casing within which the transmission mechanism is housed. Gear 12 is fixed to the input shaft which in the usual type of motor vehicle is the main clutch shaft and enters the front end of the transmission casing. The annular rearward projection 14 on the input shaft, concentric with gear 12, is a composite clutch element formed with an external conical friction surface 16 and an internal row of clutch teeth 18. The friction surface 16 is adapted to coact with an internal friction surface on a floating friction-clutch ring and the clutch teeth 18 to coact with external clutch teeth on a slidable double ended positive coupling member, both of which will be presently described.

The front end of the main output shaft 20 is piloted as usual in the rear end of the input shaft and its rear end is suitably journalled in the rear end of the casing 10. A second speed gear 22 is journalled so as to rotate freely on shaft 20 unless clutched thereto. An annular composite clutch element 24 projects forward from the gear 22. This corresponds to the projection 14 on the input shaft and comprises an external conical friction surface 26 and an internal row of clutch teeth 28. The friction surface 26 is adapted to coact with an internal conical friction surface on a floating friction clutch ring and the internal clutch teeth 28 are adapted to coact with external teeth on a slidable double ended positive coupling member splined on the output shaft 20 as will be hereinafter described.

The double ended positive coupling element referred to is indicated by the numeral 30; it is equipped with internal ribs and grooves and is guided by ribs 21 and intermediate grooves on the output shaft 20 so as to slide thereon. Coupling element 30 is also equipped with external ribs 31 and intermediate grooves, the front and rear ends 32 and 34 of the ribs constituting clutch teeth adapted to be meshed respectively with teeth 18 to couple the output shaft directly to the input for third or high speed ratio, or with teeth 20 to couple the output shaft to second speed gear 22 for second speed ratio.

Gear 36 mounted on coupling element 30 is rotatable with the latter being constructed with internal ribs and grooves interfitting with the ribs 31 and intermediate grooves on the exterior of said coupling element 30 and is slidable axially thereof to establish first or low speed ratio or reverse drive, or to assume a neutral position.

It will be understood that gear 12 on the input shaft is constantly in mesh with a gear (not shown) fixed to a countershaft 38 (Fig. 2) and constituting one of a cluster of relatively fixed gears; that said countershaft or cluster comprises also a gear (not shown) in constant mesh with said second speed gear 22 and a gear 40 adapted to be meshed with shiftable first or low speed gear 36 when the latter is slid forward from neutral. A reverse idler always in mesh with gear 40 or other countershaft gear comprises a gear element 42 adapted to be engaged by slidable gear 36 when the latter is shifted rearward from neutral position.

When the teeth 32 of slidable coupling 30 are engaged with the teeth 18 on the input shaft the input shaft is directly coupled to the output shaft and the transmission is in third speed—the highest speed ratio of the transmission gearing illustrated. When the teeth 34 of coupling 30 are engaged with the teeth 28 of second speed gear 22, the power flow is from input shaft through gear 12, the two countershaft gears in mesh respectively with gear 12 and gear 22, to output shaft 20; the transmission is then in second speed ratio. When the coupling 30 is in neutral, disengaged both from input shaft and second speed gear, and gear 36 has been moved axially forward from neutral into mesh with countershaft gear 40 the transmission is in first or low speed ratio, the power train consisting then of input shaft, gear 12, the countershaft gear in mesh with gear 12, countershaft gear 40, gear 36, slidable coupling 30 and output shaft 20. If gear 36 be slid rearward into mesh with reverse idler 42 the transmission is in reverse, the power train consisting of input shaft, gear 12, countershaft gear in mesh therewith, countershaft gear 40, reverse idler 42, gear 36, coupling element 30 and output shaft 20.

In order to avoid clashing of the teeth of the positive coupling elements during an effort to couple second or third-speed-ratio trains, friction clutches of known type are used to synchronize the mating elements of the positive couplings prior to interengaging them. As shown in Fig. 1 a floating friction clutch ring 50 having an internally-conical friction surface 52, suited to coact with external-conical friction surface 16 on the input shaft, is formed with radially inward extending arms 54, preferably three, the ends of which are loosely disposed between the ribs or splines 21 of shaft 20 so as to form a driving connection that permits of some angular movement of the clutch ring with respect to said shaft.

Another floating friction-clutch ring 60 similar to clutch ring 50 is equipped with an internally-conical friction surface 62 adapted to coact with external-conical surface 26 on part 24 which is integral with second speed gear 22. Clutch ring 60 is also provided with radially inward projecting arms 64, preferably three in number, each having an angular lost motion driving connection with shaft 20 between the ribs or splines 21 thereof.

Each end of the coupling element 30 is provided with rectangular notches 56 and 66 corresponding in number to the radial arms of the floating clutch rings, and extending from the exterior through to the shaft 20. The advance edges of these notches 56 and 66 are preferably beveled to engage corresponding bevels on the edges of arms 54 and 64 of the respective friction clutch rings when the latter, due to the lost motion connection described, are at one or the other end of their range of limited movement with respect to shaft 20. Priming springs 68 are shown in this embodiment extending through longitudinal grooves 70 on the inside of coupling element 30 and project at each end as shown at the right-hand end of element 30 in Fig. 1. The projecting portions of springs are bent somewhat outward with ends bearing against the friction clutch rings 50 and 60 and tending to press the friction-clutch surfaces together lightly in a known manner, as the coupling element 30 approaches its coacting positive coupling element, for the purpose of developing enough friction between the floating clutch ring and its companion friction element to insure alinement of the beveled checking surfaces on the coupling element and floating clutch ring in order to thereby delay meshing of the positive elements until axial pressure of the coupling element 30 against the floating clutch ring has brought the positive elements to be coupled to substantially equal speeds.

Slidable coupling element 30 is provided with a circumferential groove 80 in which a shifter arm 82 forming part of one shifter device engages. The shifter device when moved rearward slides coupling element 30 toward second speed gear 22 to synchronize it with and lock it to output shaft 20; and when moved forward slides said element 30 toward the input shaft to synchronize and lock together the input and output shafts. In the construction illustrated arm 82 is secured to shifter rod 84 within the casing slidable substantially parallel with the axis of shaft 20. Suitable detent means are provided as indicated at 85 for detaining the shifter device in neutral position or in position of engagement of said element 30 in second or third speed trains.

Slidable first speed ratio gear 36 is equipped with a circumferentially grooved hub 86 engaged by arm 88 of first speed ratio and reverse shifter device. When moved forward from neutral position arm 88 slides gear 36 toward first speed countershaft gear 40 and causes its teeth to intermesh with the teeth of gear 40 to establish first or low speed ratio. When moved rearward shifter arm 88 slides said gear 36 toward and causes its teeth to intermesh with the teeth of reverse idler gear 42 to complete the reverse gear train. Rod 90 of the first speed ratio and reverse drive shifter device is illustrated as slidable in the casing 10 substantially parallel to the axis of shaft 20. Suitable detent means as indicated at 95 are provided for detaining the shifter device in neutral position or in position established by completion of either first speed ratio or reverse drive trains.

The transmission mechanism described is of known type. The invention claimed in this application relates to the apparatus for imparting ratio changing movements to the synchronizing and coupling elements of the described type of mechanism.

In order to interconnect either selected one of the shifter devices with a master control means, subject to the will and effort of a human operator or an automatic governor, a rock shaft 100 is disposed transversely of the shifter rods within the gear case and connected with a master control not shown. The axis of said rock shaft is slightly out of parallel with a straight line connecting the axes of the shift rods and lying in a plane that includes also the axis of said rock shaft, the ends of the line and axis approaching one another more nearly at rod 84 than at rod 90. The rock shaft is equipped with two gear-shifter-device-operating arms axially spaced apart, one of which is arranged to engage with and move that shifter device which couples second and third-speed ratio trains, and the other of which is arranged to engage with and move the other shifter device which is adapted to couple first-speed ratio and reverse trains. The two gear-shifter-device-operating arms have cam-like ends and with the rods of the shifter devices may be viewed as analogous to single tooth gear segments and racks. The rock shaft is mounted in bearings in the transmission case 10 so that said shaft may be moved a limited distance lengthwise of itself and crosswise of the shifter rods as well as oscillated about its axis. Secured to the rock shaft is a lever arm 102 terminating in a cam-like member 104 capable of being engaged with or disengaged from the rod 84 as by means of a transverse notch 106, having opposed side walls constituting bearing surfaces for the cam-like member. Affixed to said shaft 100 is another lever arm 110 terminating in a cam-like member 112 in position to be engaged with or disengaged from rod 90 as by means of a notch 114 in the rod similar to that in rod 84. The members 104 and 112 are hereinafter designated cams. These cams have a nice bearing fit with both side walls of the notches throughout the ratio changing movements so that no lost motion can occur. A movement of rock shaft 100 lengthwise of itself toward the left, as indicated in Fig. 2, will move the cam 104 into notch 106 of shifter device 84 when the double-ended positive coupling element 30 is in neutral. Movement of rock shaft 100 rightward, as viewed in Fig. 2, will disengage cam 104 from the notch in shifter rod 84, and cause cam 112 to enter notch 114 in shifter device 90 when first speed gear 36 is in neutral. The lever arms 102 and 110 are secured firmly to shaft 100, preferably by set screws 103 and 104 on the same side of the shaft with their radial center lines in the same axial plane. The rock shaft 100 also acts in a known manner in cooperation with transverse notches 116 and 118 in the undersides of rods 84 and 90, respectively, to interlock the shifter devices so that both cannot move at the same time, one being locked while the other is free, and so that neither can be moved until the other is in neutral. The end part 120, which is larger in diameter than the adjacent portion of the rock shaft shown in Fig. 2 beneath rod 84, is free of the interlocking notch 116 when cam 104 is engaged in notch 106 of said rod, while at the same time the part 122 on the rock shaft, which is larger in diameter than the adjacent portion beneath rod 90, engages the transverse notch 118 of rod 90 and cam 112 is free of the notch 114 in said rod 90. The reverse condition exists when cam 104 is free of notch 106 and cam 112 is seated in notch 114. Thus it is apparent that the shifting devices and coupling elements must be in neutral position before the rock shaft can be moved endwise to select and operatively connect 10 with the shifting device desired to be operated, and that a shifting device disconnected while in neutral from its operating lever arm will remain in neutral until reengaged by said lever since it will be detained there by the neutral detent hitherto referred to.

One end of rock shaft 100 projects from the casing 10 as well shown at the right of Fig. 2. To this projecting end is secured a force-receiving lever arm or crank 130 by means of which the shaft may be rocked. Any suitable devices may be used to operate arm 130. It may be operated from a master control device at the driver's position by means of suitable linkage, a part of which is shown at 132. Rock shaft 100 may be moved lengthwise of itself to couple with the desired shifter device by any suitable means. A Bowden wire 134 is shown for this purpose and it will be understood that this wire may be extended to a position within reach of the operator.

Figure 3:
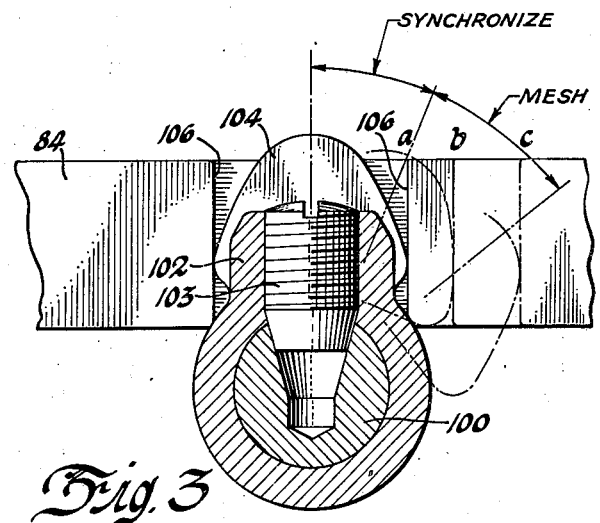
Fig. 3 is a somewhat diagrammatic view of a fragment of shifter element and of lever arm, partly in section, for effecting engagement and disengagement of the synchronized coupling elements.

Figure 3 illustrates in detail the rock shaft 100 and the attached lever arm 102 in section, with cam 104 seated in notch 106 of rod 84 of that shifter device which is adapted to interconnect either second or third-speed ratio trains to input and output. On inspection of Fig. 3 it can be apprehended that the contour of cam 104 is such that as it moves about the axis of shaft 100 in rolling and sliding contact with the bearing surface (side wall of notch 106) on shifter rod 84 it will first slide the shifter device a linear distance from $a$ to $b$, which is sufficient to press the frictional synchronizing elements together with a force adequate to bring the positive coupling elements of second speed ratio train to the same speed within the time customarily consumed in making a shift, and that after synchronization has been brought about the continued swing of arm 102 and cam 104 imparts a further longer linear movement of shifter rod from $b$ to $c$ to intermesh the positive coupling elements. Linear movements of variable extent will be imparted by a uniform angular movement of the arm 102. The contact line between cam 102 and the side wall of slot 106 on the shifter rod moves outward on the cam from the axis of shaft 100 so that the effective length of the lever increases as the arm swings rearward. The contact line moves outward on the cam a relatively small radial distance over a bearing area relatively near the lever fulcrum in sliding the rod along the linear distance from $a$ to $b$, thus affording relatively high mechanical advantage for the synchronizing effort, while in moving the rod from $b$ to $c$ to cause the positive elements to intermesh the line of contact between cam and surface 106 moves quickly outward on the cam a considerable distance over a bearing area farther from the lever fulcrum thus imparting a quick movement with lower mechanical advantage since no considerable resistance is then encountered. The resultant of the decreasing mechanical advantage due to the lengthening lever arm and the increasing mechanical advantage due to the camming action as the lever swings from neutral imparts a smooth and substantially uniform movement of the shifter device from a to b and also to the movement from b to c although the latter movement is faster than that from a to b. Thus by an even angular motion of the rock shaft and lever 102 the friction elements of second speed coupling are first caused to be engaged powerfully by reason of the increased mechanical advantage afforded during the first moiety of the range of movement of lever arm and shifter device, and after synchronization and release of pressure on the floating friction element the slidable positive coupling element is caused to move rapidly into mesh with its companion by the continuing movement of lever arm and shifter with lesser mechanical advantage and higher speed.

The operation of coupling third speed train by an angular movement of lever 102 in the opposite sense with respect to that described for coupling second speed train proceeds in the same manner and with the same results that have been described and pointed out with respect to the coupling of the second speed train.

Figure 4:
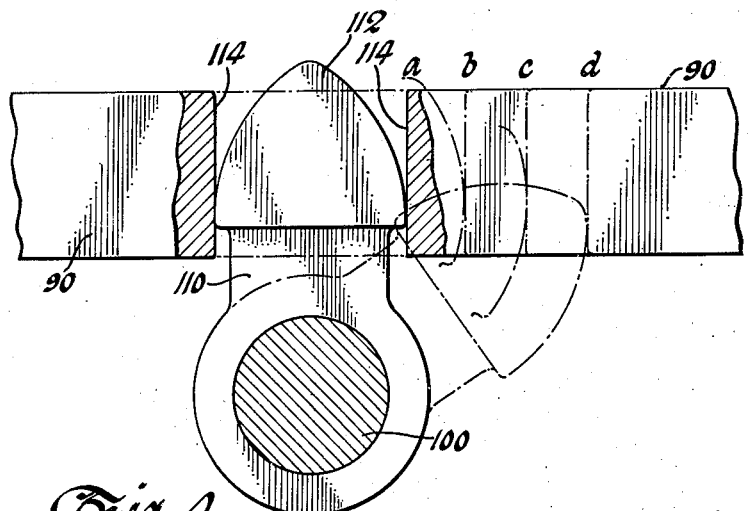
Fig. 4 is a somewhat diagrammatic view of a shifter element, partly in section, and a lever arm for effecting engagement and disengagement of the unsynchronized coupling elements.

Fig. 4 illustrates in detail rock shaft 100 in cross section, the arm 110 secured thereto, and the cam 112 on said arm engaged in cross notch 114 in the rod 90 of the shifter device constituting an instrumentality for coupling first speed and reverse trains. It may be perceived in Fig. 4 that cam 112 is a uniform motion cam so formed that in moving the shifter device from neutral position a to final position of complete mesh d, a given uniform angular movement of rock shaft 100 and lever arm 110 imparts a uniform linear movement to the shifter device.

Inasmuch as a longer axial movement is necessary to be imparted to first speed gear 36 in order to fully engage it with the countershaft first speed gear 40 or with reverse idler gear 42, than is necessary to be imparted to positive coupling element 30 in order to actuate the synchronizer and cause it to engage with its companion positive coupling elements of jaw type, the shifter-device-operating levers are appropriately designed to impart the requisite amplitude of linear movement to the respective shifting devices in response to substantially equal and conveniently short amplitudes of movement imparted to the operating arm 130.

Having explained the principle of the machine that is the subject of this application, and having described and illustrated one specific embodiment of the invention in the best form now known to the applicant, claims are appended hereto which particularly point out and delimit the invention sought to be protected by patent, all as provided by statute.

I claim:

1. In mechanism for effecting engagement and disengagement of a composite coupling consisting of positive and friction synchronizing clutch elements, the combination of an axially movable shifter device; means interposed between said shifter device and said coupling operative in response to axial movement of the former from neutral position first to effect engagement and release of the friction elements and thereafter engagement of the positive elements; opposed bearing surfaces disposed transversely on the shifter device; a shifter-device-operating lever having a camming portion disposed between said transverse bearing surfaces, said camming portion having a convex bearing area, relatively near the lever fulcrum, and operating during angular movement of the lever away from neutral position to move the shifter device a distance sufficient to effect synchronizing engagement of the friction clutch elements, and a convex bearing area more remote from the fulcrum operating to effect engagement of the positive clutch elements after synchronization.

2. A combination as defined in claim 1 in which the axially movable shifter device includes a slidable rod having a transverse notch the end walls of which constitute said opposed bearing surfaces disposed transversely on the shifter device.

3. In step by step variable ratio power transmission mechanism comprising input and output members and a plurality of different ratio power transmitting trains adapted to be coupled selectively to said members, one of said trains comprising a composite engageable and disengageable coupling consisting of positive and friction synchronizing clutch elements, and another train comprising coupling means consisting of a pair of gears one of which is shiftable into mesh with the other; the combination of two spaced apart shifter devices extending substantially parallel with the direction of shift of the coupling elements operatively connected respectively with the composite coupling and the shiftable gear, a rock shaft extending transversely of and having its respective end portions adjacent the shifter devices; two shifter-device-operating levers axially spaced apart and rotatively fixed to said rock shaft one adjacent each shifter device; transverse bearing means on each shifter device; means for moving the respective shifter-device-operating levers into and out of operative engagement with the bearing means on the shifter devices, the shifter-device-operating lever that is arranged to effect engagement of the composite coupling being constructed to exert a higher mechanical advantage during the early part of its movement necessary to effect synchronization than during the latter part of its movement to effect engagement of the positive elements; and the other shifter-device-operating lever being constructed to impart to the other shifter device and the shiftable gear a uniform movement of greater linear extent than that effected by the first named lever on the composite coupling in response to equal angular movements of the rock shaft.

4. In a step by step variable ratio power transmission mechanism comprising input and output members and a plurality of different ratio power transmitting trains adapted to be coupled selectively to said members, said trains comprising axially spaced composite frictional and positive clutches and axially fixed and slidable gears adapted to be meshed selectively; the combination of a first shifter device including a transversely notched slidable rod for effecting engagement and disengagement selectively of the composite clutches; a second shifter device including a transversely notched slidable rod parallel with that of the first shifter device; a rock-shaft disposed transversely adjacent both slidable rods and adapted to be partially rotated; spaced apart shifter-device-operating arms of different lengths non-rotatively secured to said rock shaft each arm terminating in a convex cam, the cam on the shorter arm having a contour designed to engage the notched slidable rod of the first shifter device near the axis of the rock shaft during the first part of its angular movement away from neutral position and farther from said axis during the latter part of its movement in order to exert a high mechanical advantage during the engaging movement of the frictional clutches and a lower mechanical advantage and higher speed thereafter to effect engagement of the positive clutches; the cam on the longer arm having a contour adapted to impart a longer, uniform and more rapid movement to the notched slidable rod of the second shifter device; means for effecting simultaneous engagement and disengagement of one cam and disengagement of the other with the notched slidable rods of the respective shifter devices, and means for effecting partial rotation of the rock shaft.

JOHN DOLZA.